(12) United States Patent
Goersmann et al.

(10) Patent No.: US 7,930,881 B2
(45) Date of Patent: Apr. 26, 2011

(54) EXHAUST SYSTEM FOR LEAN BURN IC ENGINE INCLUDING PARTICULATE FILTER AND $NO_x$ ABSORBENT

(75) Inventors: Claus Friedrich Goersmann, Herts (GB); Paul Richard Phillips, Herts (GB); Philip Gerald Blakeman, Cambridge (GB); Guy Richard Chandler, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 1208 days.

(21) Appl. No.: 10/547,916

(22) PCT Filed: Mar. 8, 2004

(86) PCT No.: PCT/GB2004/000994
§ 371 (c)(1),
(2), (4) Date: Jul. 6, 2006

(87) PCT Pub. No.: WO2004/079170
PCT Pub. Date: Sep. 16, 2004

(65) Prior Publication Data
US 2006/0248874 A1     Nov. 9, 2006

(30) Foreign Application Priority Data
Mar. 8, 2003   (GB) .................................. 0305415.2

(51) Int. Cl.
*F01N 3/00*     (2006.01)

(52) U.S. Cl. ................ 60/297; 60/274; 60/285; 60/289; 60/295; 60/303

(58) Field of Classification Search .................. 60/274, 60/285, 286, 289, 295, 297, 303; 422/170, 422/171, 172, 177, 182
See application file for complete search history.

(56) References Cited

U.S. PATENT DOCUMENTS

| | | | |
|---|---|---|---|
| 4,329,162 A | 5/1982 | Pitcher, Jr. | |
| 6,314,722 B1* | 11/2001 | Matros et al. | 60/274 |
| 6,539,709 B2* | 4/2003 | Kubo et al. | 60/301 |
| 6,729,125 B2* | 5/2004 | Suga et al. | 60/285 |
| 6,758,036 B1* | 7/2004 | Molinier | 60/286 |
| 6,877,313 B1* | 4/2005 | Phillips et al. | 60/297 |
| 6,938,412 B2* | 9/2005 | Li et al. | 60/300 |
| 2002/0081238 A1 | 6/2002 | Duvinage et al. | |

FOREIGN PATENT DOCUMENTS

| | | |
|---|---|---|
| DE | 199 21 974 A1 | 11/2000 |
| EP | 0 341 832 B1 | 11/1989 |
| EP | 0 560 991 A1 | 9/1993 |
| EP | 0 758 713 A1 | 2/1997 |
| EP | 1 057 519 A1 | 12/2000 |
| EP | 1 217 196 A2 | 6/2002 |
| EP | 1 304 455 A1 | 4/2003 |
| EP | 1 321 643 B1 | 6/2003 |
| WO | WO-00/21647 | 4/2000 |

* cited by examiner

*Primary Examiner* — Tu M Nguyen
(74) *Attorney, Agent, or Firm* — RatnerPrestia

(57) ABSTRACT

An exhaust system for a lean burn internal combustion engine includes a particulate filter (CSF), a first $NO_x$ absorbent ($NO_x$(1)) disposed upstream of the filter and a second $NO_x$ absorbent ($NO_x$(2)) disposed downstream of the filter.

17 Claims, 11 Drawing Sheets

$NO_x$ passes through $NO_x$ (1), which also releases some $NO_2$,
CSF regenerates with $NO_2$ released or passing through $NO_x$ (1),
$NO_x$ (2) traps $NO_x$ passing through CSF

EXHAUST SYSTEM FOR LEAN BURN IC ENGINE INCLUDING PARTICULATE FILTER AND $NO_x$ ABSORBENT

This application is the U.S. National Phase application of PCT International Application No. PCT/GB2004/000994, filed Mar. 8, 2004, and claims priority of British Patent Application No. 0305415.2, filed Mar. 8, 2003.

FIELD OF THE INVENTION

The present invention relates to an exhaust system for a lean burn internal combustion engine, and in particular it relates to an exhaust system comprising a particulate filter and a $NO_x$ absorbent.

BACKGROUND OF THE INVENTION

Generally, the level of acceptable emissions from vehicular internal combustion engines is regulated by legislation. Such levels are being tightened in the years to come, and so the challenge for vehicle manufacturers (original equipment manufacturers or OEMs) is how to meet them. Amongst the legislated exhaust gas components are particulate matter (PM), nitrogen oxides ($NO_x$), carbon monoxide (CO) and hydrocarbons (HC). A widely adopted measure to meet legislated levels on PM is the particulate or soot filter. Broadly, such filters increase the residence time of PM in an exhaust system to enable it to be destroyed and can include ceramic wall-flow filters or wire mesh filters.

Typically, a wall-flow filter is in the form of a honeycomb. The honeycomb has an inlet end and an outlet end, and a plurality of cells extending from the inlet end to the outlet end, the cells having porous walls wherein part of the total number of cells at the inlet end are plugged, e.g. to a depth of about 5 to 20 mm, along a portion of their lengths, and the remaining part of the cells that are open at the inlet end are plugged at the outlet end along a portion of their lengths, so that a flowing exhaust gas stream passing through the cells of the honeycomb from the inlet end flows into the open cells, through the cell walls, and out of the filter through the open cells at the outlet end. A composition for plugging the cells is described in U.S. Pat. No. 4,329,162 (incorporated herein by reference). A typical arrangement is to have every other cell on a given face plugged, as in a chequered pattern.

A problem associated with the use of particulate filters is how to destroy the PM collected from an exhaust gas throughout a lean burn engine cycle. Generally, diesel PM combusts in oxygen ($O_2$) at above about 550° C. However, diesel exhaust gas temperatures, particularly in light-duty diesel engines, can be as low as 150° C. during certain phases of a drive cycle due, for example, to the increasingly heavy use of exhaust gas recirculation (EGR) to lower $NO_x$ emissions. If PM is allowed to build up, the back-pressure can increase thereby increasing the load on the engine. Increased engine load can lead to increased fuel consumption and, in a worst case, engine wear or destruction of the filter caused by uncontrolled combustion of large amounts of PM. Whilst increasing the engine load, e.g. through increased back-pressure due to PM build-up, can also increase the exhaust gas temperature sufficiently to combust the PM, such temperature increase can be insufficient reliably to keep the filter clear.

Light-duty diesel engines are defined in European legislation by European Directive 70/220/EEC, as amended by 93/59/EC and 98/69/EC. In the USA passenger vehicles, light light-duty trucks (LLDT), below 6000 lbs gross vehicle weight rating (GVWR) and heavy light-duty trucks (HLDT), above 6000 lbs are included in the light-duty diesel category. The exhaust gas temperatures emitted from light-duty diesel engines are generally lower than those of heavy-duty diesel engines (as defined by the relevant legislation).

It is known to catalyse particulate filters in order to lower the soot combustion temperature to facilitate regeneration of the filter passively by oxidation of PM under exhaust temperatures experienced during regular operation of the engine/vehicle, typically in the 300-400° C. range. In the absence of the catalyst, PM can be oxidized at appreciable rates at temperatures in excess of 500° C., which are rarely seen in diesel engines during real-life operation. Such catalysed filters are often called catalysed soot filters (or CSFs).

A common problem with passive filter regeneration is that driving conditions can prevent exhaust gas temperatures achieving even the lower temperatures facilitated by catalysing the filter frequently enough to reliably prevent PM from building up on the filter. Such driving conditions include extended periods of engine idling or slow urban driving and the problem is particularly acute for exhaust gas from light-duty diesel engines. One solution to this problem which has been adopted by OEMs is to use active techniques to regenerate the filter either at regular intervals or when a predetermined filter backpressure is detected in addition to passive regeneration. A typical arrangement in a light-duty diesel vehicle is to position a diesel oxidation catalyst (DOC) on a separate monolith upstream of the CSF and to regulate in-cylinder fuel combustion by various engine management techniques in order to introduce increased amounts of unburned fuel into the exhaust gas. The additional fuel is combusted on the DOC, increasing the temperature in the downstream CSF sufficiently to promote combustion of PM thereon.

A significant advance in treating PM was made with our discovery that diesel PM can be combusted in nitrogen dioxide ($NO_2$) at up to 400° C. (see our EP-B-0341832 (incorporated herein by reference)). $NO_2$ can be obtained by oxidising nitrogen monoxide (NO) in the exhaust gas over a suitable oxidation catalyst and reacted with PM on a downstream filter. This advance enables the PM to be destroyed within a normal exhaust gas temperature window for many diesel engines. We market devices incorporating this process as CRT®. However, whilst the process has been adopted successfully in heavy-duty diesel applications, there still remain difficulties with its use in certain lean burn internal combustion engines, particularly light-duty diesel engines. The recurring problem is low exhaust gas temperature, e.g. thermodynamic limitation on PM combustion in $NO_2$ and the NO to $NO_2$ equilibrium.

The process of absorbing $NO_x$ from a lean exhaust gas on a $NO_x$ absorbent such as barium to "store" it as the nitrate and release the stored $NO_x$ and reduce it to dinitrogen ($N_2$) in exhaust gas containing less oxygen is known, e.g. from EP 0560991 (incorporated herein by reference). Typically, when this technology is used in practice, techniques are employed to assess the remaining capacity of the $NO_x$ absorbent and for controlling the engine to switch transiently and intermittently to running conditions producing exhaust gas having a lower $O_2$ concentration relative to normal lean running conditions (i.e. enriched exhaust gas) in order to remove the stored $NO_x$ as dinitrogen ($N_2$), thereby to regenerate the $NO_x$ absorbent.

Figure 1:
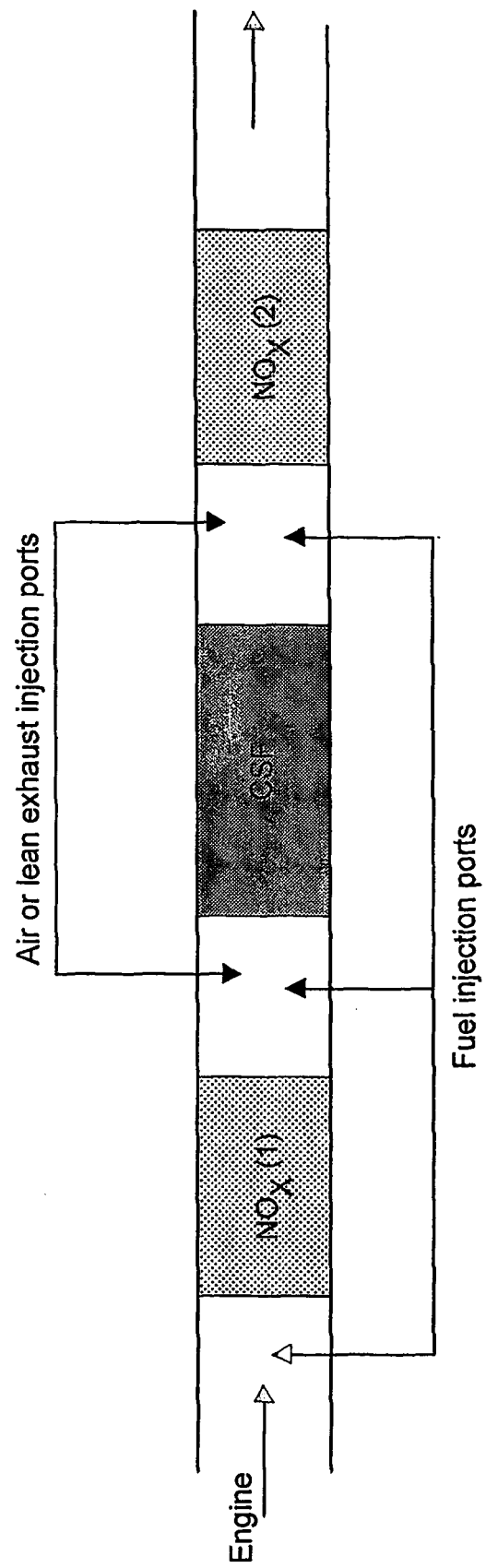
FIG. 1 is a schematic diagram of the exhaust system according to the invention.
Figure 2:
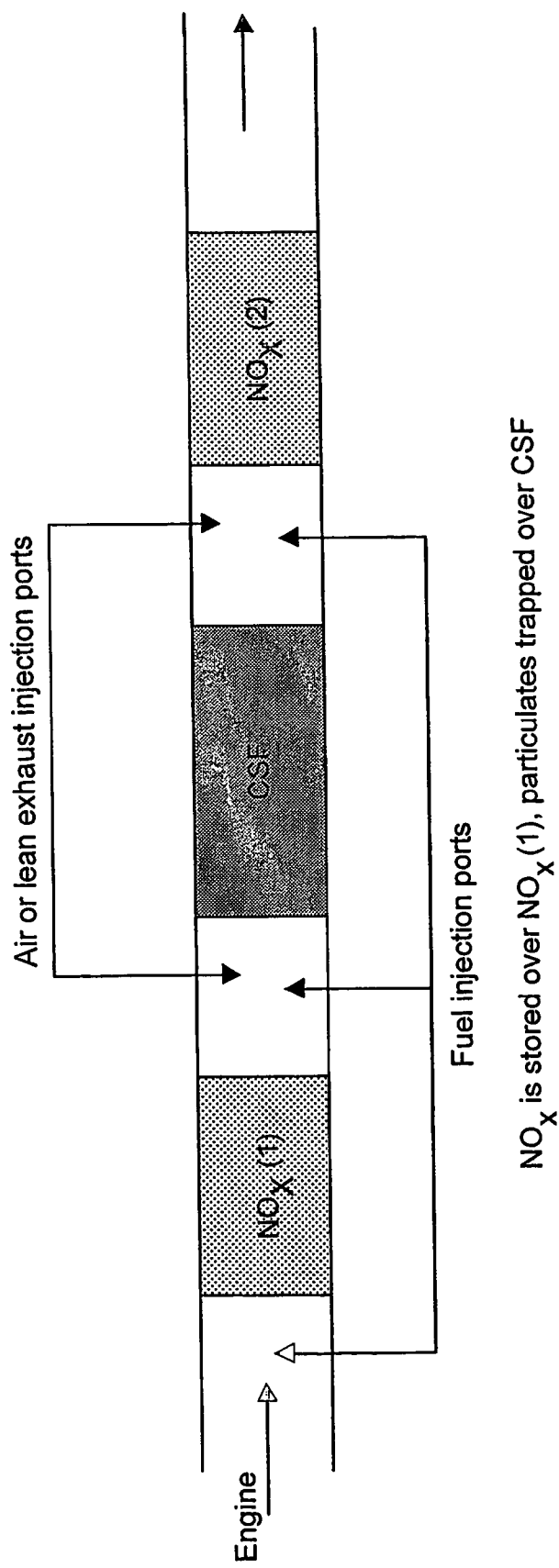
FIG. 2 is a schematic diagram explaining the operation of the exhaust system when cold, e.g. following cold start or during periods of a drive cycle generating cooler exhaust gases.
Figure 3:
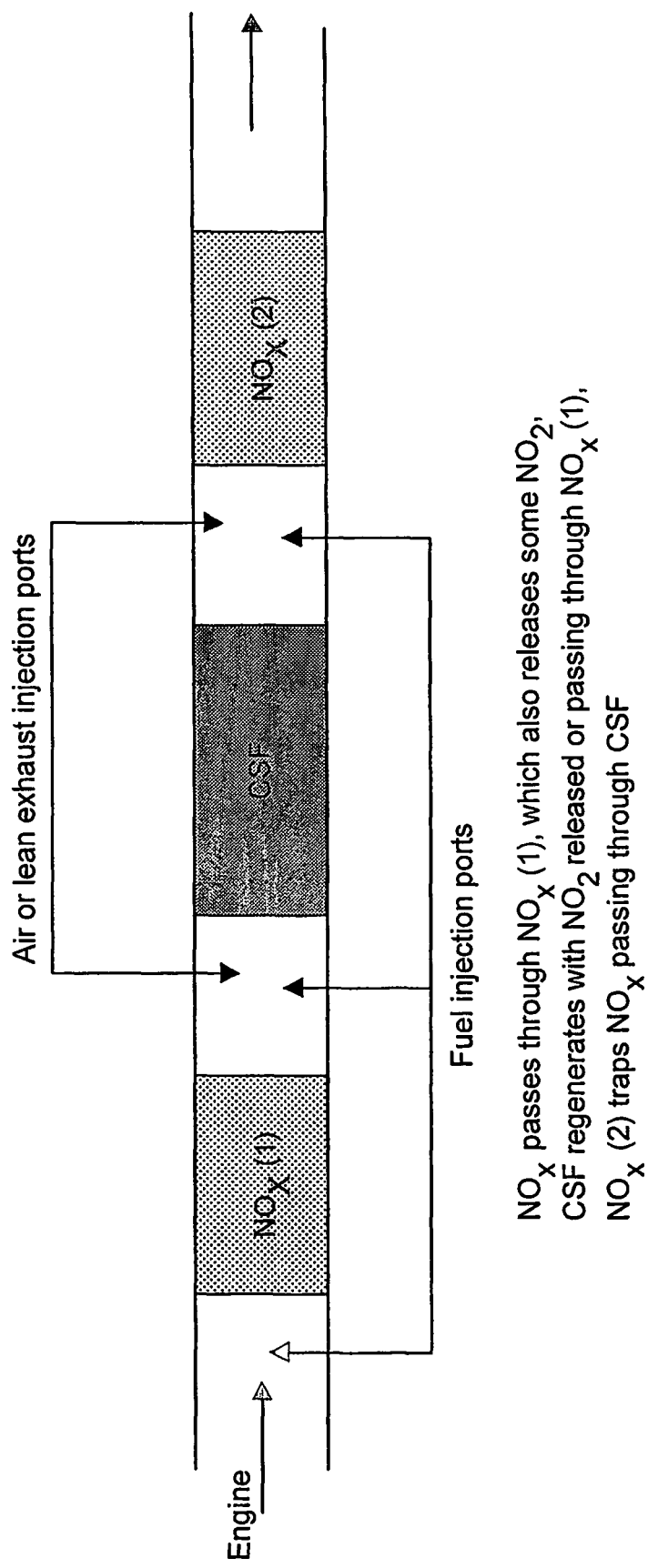
FIG. 3 is a schematic diagram explaining the operation of the exhaust system at temperatures of 300° C. and above.
Figure 4:
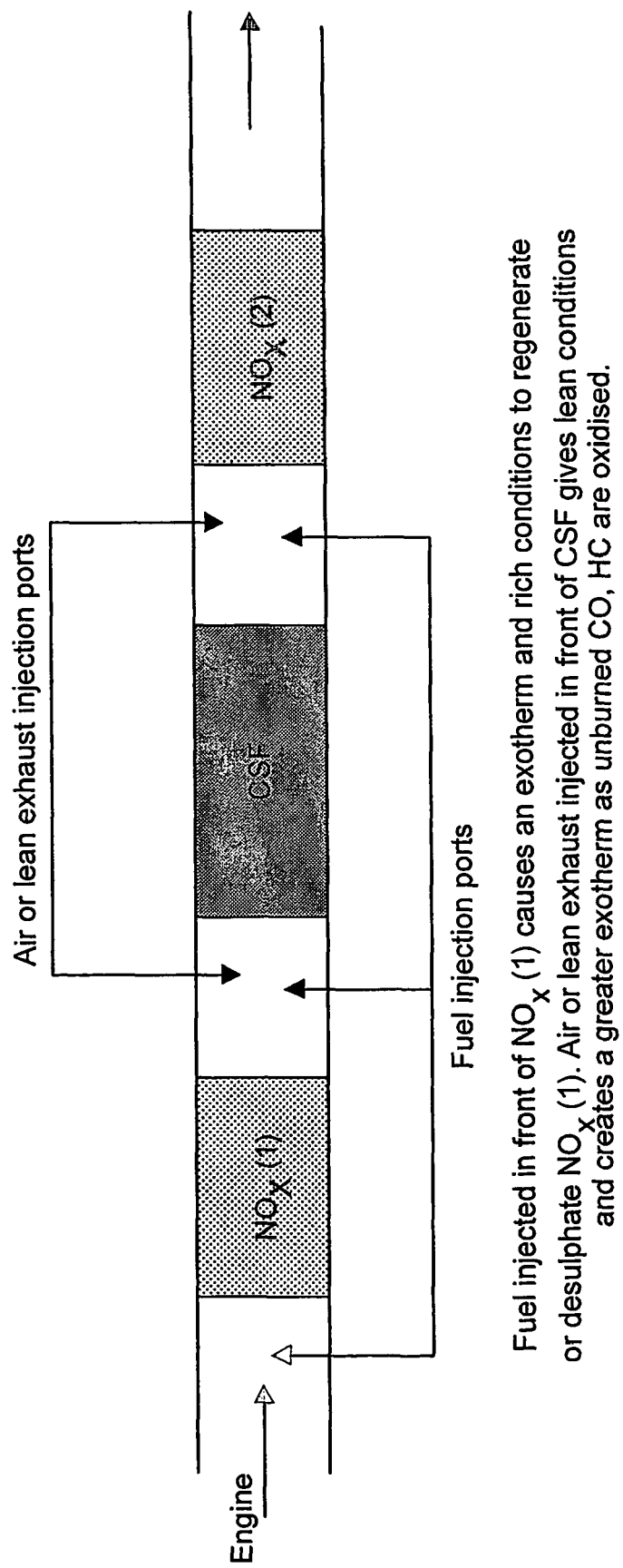
FIG. 4 is a schematic diagram explaining the operation of the exhaust system in regenerating the first $NO_x$ absorbent.
Figure 5:
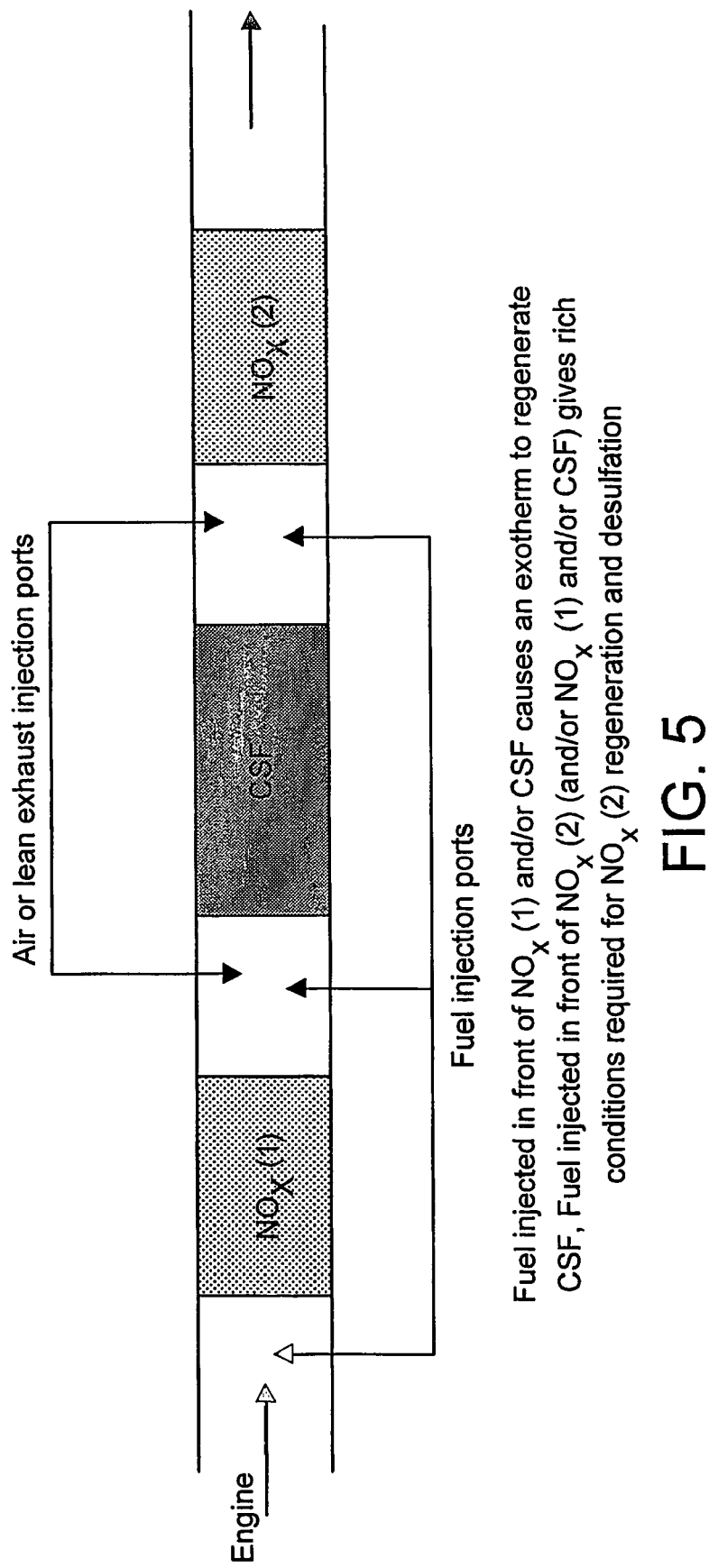
FIG. 5 is a schematic diagram explaining the operation of the exhaust system in regenerating the catalysed soot filter and the second $NO_x$ absorbent.

We believe that the annotations of FIGS. 1-5 inclusive are self-explanatory. "$NO_x$ (1)" in the Figures is the first $NO_x$ absorbent: "$NO_x$ (2)" is the second $NO_x$ absorbent; and "CSF" is an acronym for catalysed soot filter.

DETAILED DESCRIPTION OF THE INVENTION

The term "absorbent" used herein embraces both "adsorbent", i.e. a solid that takes up onto its surface another solid, a vapour or a gaseous species in contact therewith, and "absorbent", i.e. a material that can take up and incorporate a solid, a vapour or a gaseous species in contact therewith.

The term "enriched" used herein means a lower $O_2$ concentration relative to normal lean running conditions and embraces both lambda>1 and 1>lambda values.

Devices comprising a $NO_x$ absorbent including catalysts, such as platinum, to promote oxidation of NO to $NO_2$ in lean exhaust gas conditions and e.g. rhodium to catalyse the reduction of $NO_x$ released from the $NO_x$ absorbent to $N_2$ during periodic rich conditions are known as lean $NO_x$ traps or simply $NO_x$ traps.

We have now discovered a way of using a $NO_x$ absorbent to improve the emissions of PM and $NO_x$ over a drive cycle of a lean burn internal combustion engine, such as a light-duty diesel engine.

According to one aspect, the invention provides an exhaust system for a lean burn internal combustion engine, which system comprising a particulate filter, a first $NO_x$ absorbent disposed upstream of the filter and a second $NO_x$ absorbent disposed downstream of the filter.

By the term "particulate filter", we mean any device that increases the residence time of PM in the device relative to a flow through monolith constructed of like material, wall thickness, open frontal area and cell density comprising an array of straight, parallel channels disposed parallel to the direction of flow of an exhaust gas. Examples of such devices are wall flow filters constructed of cordierite or silicon carbide, metal filters e.g. of wire mesh and devices including channels which present a twisting path to exhaust gases flowing therethrough, e.g. EP 1057519 (incorporated herein by reference).

The use of $NO_x$ absorbents in association with the process of combusting PM in $NO_2$ is described in EP 0758713 (incorporated herein by reference). However, in that arrangement the single $NO_x$ absorbent is disposed downstream of the filter.

In one embodiment, the first $NO_x$ absorbent is adapted to release stored $NO_x$ during lambda>1 conditions at about 300° C. and above. In this embodiment, the first $NO_x$ absorbent can comprise a material capable of absorbing $NO_x$ at up to about 300° C. in lean exhaust gas conditions. Such materials can include at least one of cerium, lanthanum, alumina ($Al_2O_3$), iron, zinc, calcium, sodium and magnesium and mixtures of any two or more thereof. It is believed that, in lean conditions, the aforesaid elements will be in the form of their oxide compounds, although they may also be present as carbonates and/or hydroxides. These compounds are understood to form nitrates when in contact with the $NO_x$. However, these nitrates are believed to be thermodynamically unstable above about 300° C., even in lean exhaust gas, and may decompose to release $NO_x$ as NO or $NO_2$. At lower oxygen concentrations in the presence of a reducing catalyst such as rhodium, the released NO and $NO_2$ can be reduced to $N_2$.

An aspect of the invention is that $NO_x$ in an exhaust gas can be absorbed by the first $NO_x$ absorbent when the exhaust gas temperature is low, for example following cold-start or during periods of a drive cycle where the exhaust gas temperature drops, and can be released as $NO_2$ during lean running conditions for combustion of PM held on the filter downstream when temperatures are more thermodynamically favourable for combustion of the PM, according to the process described in EP 0341832, mentioned above.

Generally, $NO_x$ stored on the first $NO_x$ absorbent may be desorbed at lower temperatures in a rich exhaust gas composition. In this instance, the $NO_x$ can be reduced to $N_2$ if the first $NO_x$ absorbent comprises a $NO_x$ reduction catalyst such as rhodium. Rhodium is unlikely, however, to result in the net reduction of $NO_x$ released during lean running conditions.

According to a further embodiment, the second $NO_x$ absorbent disposed downstream of the filter is capable of storing $NO_x$ at from about 300° C. to about 550° C. during lambda>1 conditions. Suitable materials for the second $NO_x$ absorbent comprise at least one alkali metal, such as potassium or caesium, at least one alkaline earth metal e.g. strontium or barium, or at least one rare earth metal or a mixture of any two or more thereof.

The at least one rare earth metal can be yttrium, praseodymium, neodymium, promethium, samarium, europium, gadolinium, terbium, dysprosium, holmium, erbium, thulium, ytterbium and lutetium or a mixture of any two or more thereof.

An advantage of using the above-mentioned materials in the first $NO_x$ absorbent is that $NO_x$ can be treated in the system during periods of low exhaust gas temperature e.g. following cold-start or extended periods of idling or slow driving. $NO_x$ released from this first $NO_x$ absorbent can be treated using the second $NO_x$ absorbent, positioned e.g. underfloor, when it has reached a desired operational temperature.

According to a further embodiment, at least one of the first and second $NO_x$ absorbent includes at least one platinum group metal (PGM). Such at least one PGM can be platinum, palladium or rhodium, for example. Whilst both the first and second $NO_x$ absorbents can include platinum and rhodium, or palladium, in one embodiment, the first $NO_x$ absorbent includes platinum as the sole PGM. This is for at least two reasons. Firstly, in the embodiment where the first $NO_x$ absorbent is designed to release stored $NO_x$ at temperatures of about 300° C. and above in lean exhaust gas, the presence of rhodium for the purpose of reducing released $NO_x$ to $N_2$ in enriched exhaust gas is unnecessary.

Secondly, if enriched engine-derived exhaust gas is intended to regenerate the second $NO_x$ absorbent, the presence of rhodium on the first $NO_x$ absorbent could undesirably remove some HC upstream of the second $NO_x$ absorbent.

In a further embodiment, the filter in the exhaust system is catalysed. The catalyst can comprise at least one PGM, which PGM can be supported directly by the material forming the filter or supported on a high surface area particulate refractory oxide and coated on the filter substrate. Methods of making the directly supported substrate are known and include soaking the filter material, e.g. cordierite, in an aqueous solution of the PGM, then drying and firing the resulting piece.

If the PGM is supported on a particulate refractory oxide, it can be fixed to the refractory oxide by calcination before coating on the substrate or a washcoat of the refractory oxide can be coated on the substrate and subsequently impregnated with an aqueous PGM solution using known techniques. However, it is important that the size of the particulate support is chosen so that the refractory oxide does not block the pores of the filter substrate so that the back-pressure of the filter is significantly increased, relative to an uncoated filter, or the filtration efficiency may be impaired. We have found that, in general, pores of up to 25 μm, e.g. 15-25 μm, are useful for filtering diesel PM, and so we prefer that the particulate refractory oxide should be smaller than this size. This means that washcoat particles can sit within the pores without totally blocking them.

Alternatively, or in addition, the catalyst can comprise a soot combustion catalyst comprising a molten salt selected from the group consisting of an alkali metal salt of vanadium, tungsten or molybdenum, an alkaline earth metal salt of vanadium, tungsten or molybdenum or a lanthanum salt of vanadium, tungsten or molybdenum, vanadium pentoxide, silver vanadate and copper vanadate. Suitable alkali metals include one or both of potassium or caesium. Alkaline-earth metals can be selected from magnesium, calcium, strontium, barium and any two or more thereof.

A further aspect of the invention is to use the components of the exhaust system of the present invention to manage heat in the system more efficiently, and thereby to improve conversion of target exhaust gas components. As mentioned above, a problem for treating exhaust gases from lean burn internal combustion engines, particularly light-duty diesel engines, is that the exhaust gas temperature can be undesirably low during certain phases of a drive cycle. This can make it difficult catalytically to treat exhaust gases in order to meet legislated limits. By more effectively managing the retention, or generation of heat within the system, such problems can be reduced or avoided.

Whereas the invention is capable of increasing the extent of PM combustion by $NO_2$ at moderate temperatures, it is envisaged that the PM may contain fractions readily combustible with $O_2$. Operation of the invention may include combustion of PM on the filter in $O_2$ at higher temperatures (relative to combustion in $NO_2$) in lean conditions, whereas the $NO_x$ trap regeneration typically requires higher temperatures and/or enriched conditions to remove $NO_x$ and even higher temperatures and preferably rich conditions to remove sulfur oxides ($SO_x$).

In order to promote lean combustion of PM at higher temperatures on the filter, a catalyst in the first $NO_x$ absorbent can be used to combust HC in the exhaust gas, either post-injected HC or engine-derived HC from modulation of the engine air-to-fuel ratio, thereby to increase the temperature of the filter. $O_2$ to combust HC and/or CO to generate the exotherm can be provided by injection of secondary air or lean exhaust gas (e.g. from a parallel exhaust line) between the first $NO_x$ absorbent and the filter. Alternatively, or in addition, an oxygen storage component (OSC), e.g. ceria or a ceria-zirconia mixed oxide, can be disposed downstream of the first $NO_x$-absorbent, optionally downstream of any HC injector, or between the first $NO_x$ absorbent and the particulate filter. The first $NO_x$ absorbent may also be regenerated in part or in full by action of the HC for generating the exotherm. An additional exotherm can be generated on the filter catalyst, where present.

The generation of an exotherm, and increased temperatures, in the filter can result in an increase in the temperature of the second $NO_x$ absorbent, yet typically the exhaust gas contacting the second $NO_x$ absorbent will be lean. Accordingly, means can be provided for introducing HC between the filter and the second $NO_x$ absorbent for changing the exhaust gas composition to enrich the exhaust gas to release $NO_x$ and/or $SO_x$, as desired. Of course, in certain embodiments, e.g. where the filter is uncatalysed, the system can be arranged so that sufficient HC is allowed to slip the filter to regenerate the second $NO_x$ absorbent so that the provision of an injector for HC between the filter and the second $NO_x$ absorbent can be avoided, or the amount of HC required to be injected can be reduced. Additional $O_2$ to combust HC to generate an exotherm over the second $NO_x$ absorbent can also be provided (whilst maintaining a rich exhaust gas composition) if desired by injection of secondary air or lean exhaust gas between the filter and the second $NO_x$ absorbent or by providing an OSC downstream of the point of HC injection.

Control of the enrichment of the exhaust gas with a reductant, e.g. a hydrocarbon, such as the fuel that powers the engine, and introduction of secondary air or a lean exhaust gas can be controlled, in use, by an engine control unit (ECU) including, for example, a suitably programmed processor or computer 'chip'.

In a further embodiment, the system includes an oxidation catalyst for oxidising NO in an exhaust gas to $NO_2$, which catalyst can be disposed between the first $NO_x$ absorbent and the filter. This embodiment adopts an arrangement described in EP 341832, mentioned above. An advantage of this arrangement, and/or the embodiment where the filter is catalysed, is that HC slip is minimised during $NO_x$ absorbent regeneration of the first $NO_x$ absorbent. According to another embodiment, the oxidation catalyst can be disposed between the exhaust manifold and the first $NO_x$ absorbent, preferably upstream of any HC injector.

In a particular embodiment, the oxidation catalyst and the OSC are combined. In one such arrangement, the catalyst comprises ceria, e.g. a ceria-zirconia mixed oxide, optionally comprising at least one PGM supported thereon.

The or each $NO_x$ absorbent and any filter catalyst or NO oxidation catalyst for use in the invention can comprise a support comprising alumina, silica, silica-alumina, zirconia, titania, ceria, ceria-zirconia or a mixture of any two or more thereof or a mixed oxide or composite oxide of any two or more thereof.

By "composite oxide" herein, we mean a largely amorphous oxide material comprising oxides of at least two elements which are not true mixed oxides consisting of at least two metals.

The support can be stabilised with at least one rare earth metal, as is known in the art. The at least one rare earth metal can be lanthanum, yttrium, cerium, praseodymium, neodymium, promethium, samarium, europium, gadolinium, terbium, dysprosium, holmium, erbium, thulium, ytterbium, lutetium or mixtures of any two or more thereof.

According to a further aspect, the invention provides a lean burn internal combustion engine including an exhaust system according to the invention. In one embodiment, the engine is a diesel engine, preferably a light-duty diesel engine.

According to a further aspect, the invention provides a method of controlling $NO_x$ in the exhaust system of a lean burn internal combustion engine, which method comprising collecting PM from an exhaust gas downstream of a first $NO_x$ absorbent, absorbing $NO_x$ in the first $NO_x$ absorbent when the first $NO_x$ absorbent is at up to 300° C. in temperature, desorbing absorbed $NO_x$ when the first $NO_x$ absorbent is at above 300° C. to add to pre-existing $NO_x$ in the exhaust gas, combusting the collected soot in $NO_2$ in the exhaust gas and absorbing $NO_x$ derived from the combustion of soot in the $NO_2$.

In order that the invention may be more fully understood, an illustrative embodiment and an Example are provided by way of illustration only and with reference to the accompanying drawings, in which:

EXAMPLE

A light-duty Diesel engine with a rich in-cylinder calibration was fitted with an exhaust system comprising the arrangement shown in FIG. 1, except in that engine management was used to provide engine-derived hydrocarbon enrichment of the exhaust gas, i.e. no fuel was injected downstream of the exhaust manifold, and an air injector was disposed between the $NO_x$ trap (1) and a catalysed soot filter. The catalysed soot filter was a cordierite wall-flow filter catalysed with a washcoat comprising platinum supported on both an alumina-based particulate refractory oxide and by the filter material itself. The filter was prepared by coating the uncoated filter with a washcoat comprising the refractory oxide, drying and calcining the resulting piece and then impregnating the washcoated filter using an aqueous solution of a platinum salt to a loading of 100 gft$^{-3}$.

$NO_x$ trap (1) was a low temperature trap comprising a ceramic flow-through monolith substrate coated with a washcoat comprising an alumina-based particulate refractory oxide and an OSC supporting platinum, barium, cerium and rhodium. The high temperature $NO_x$ trap (2) had a similar construction except in that the formulation included caesium.

Figure 6:
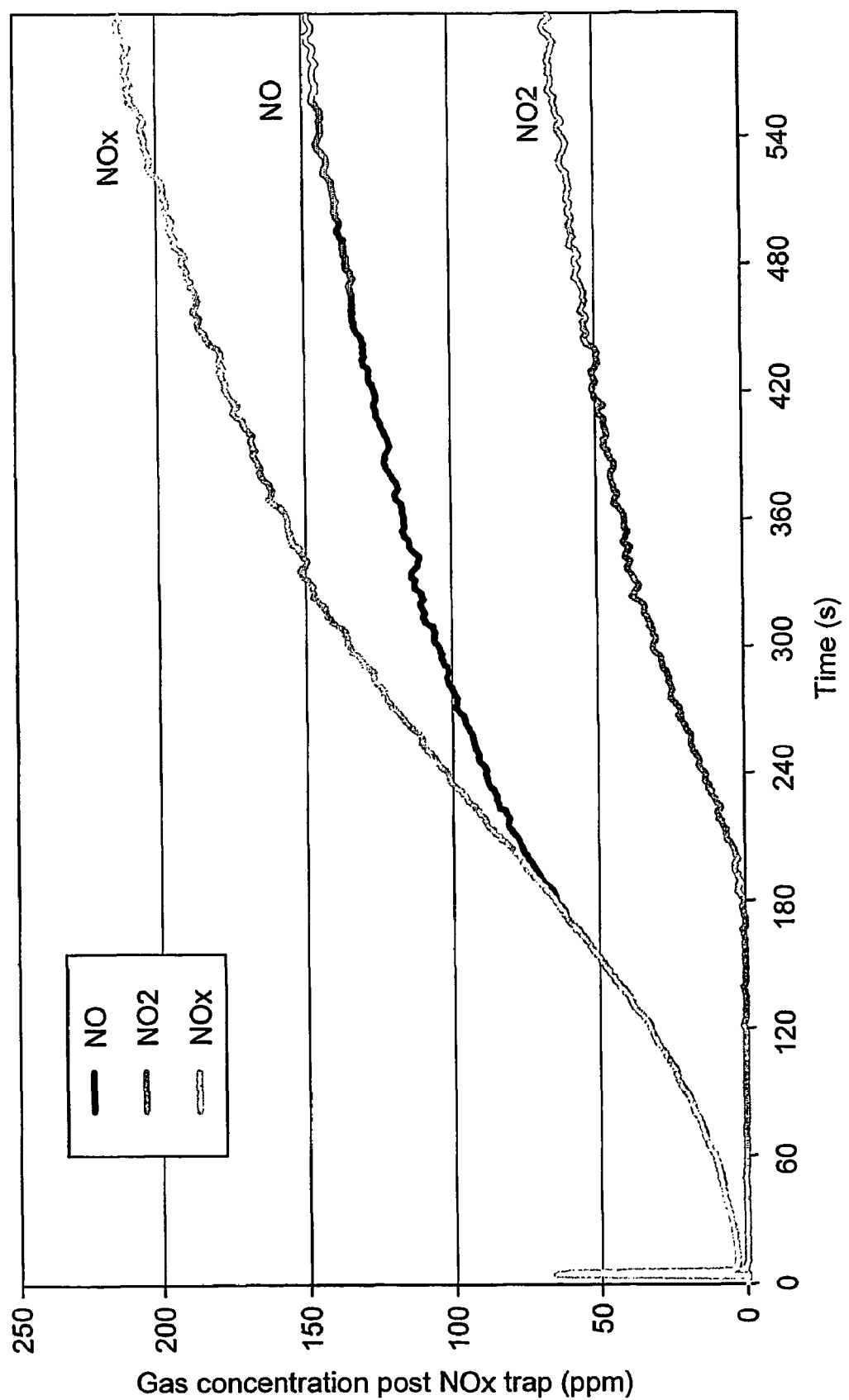
FIG. 6 is a trace of gas concentration against time showing specification of $NO_x$ downstream of $NO_x$ trap (1)

Running at an exhaust temperature of 350° C., FIG. 6 shows speciation of $NO_x$ slip after $NO_x$ trap (1). $NO_2$ concentration upstream of the $NO_x$ trap is 14 ppm (6% of total $NO_x$). It can be seen that a high proportion of the $NO_x$ is $NO_2$ (up to 30% of total $NO_x$ slip), which is available therefore to react with soot in the downstream CSF according to the process disclosed in EP 0341832.

The system was configured to cycle between lean and rich running conditions at an engine-out exhaust temperature of 450° C. Lean periods were adjusted to 300 s long, each rich period was 8 s long. It can be seen from FIG. 7 that introducing a rich pulse over $NO_x$ trap (1) by reducing the oxygen concentration in the exhaust gas upstream of $NO_x$ trap (1) results in a temperature increase of the exhaust gas as reductant is combusted in the remaining oxygen. This extra heat can be used to regenerate $NO_x$ trap (1) for $NO_x$ or $SO_x$ under the rich condition.

Figure 7:
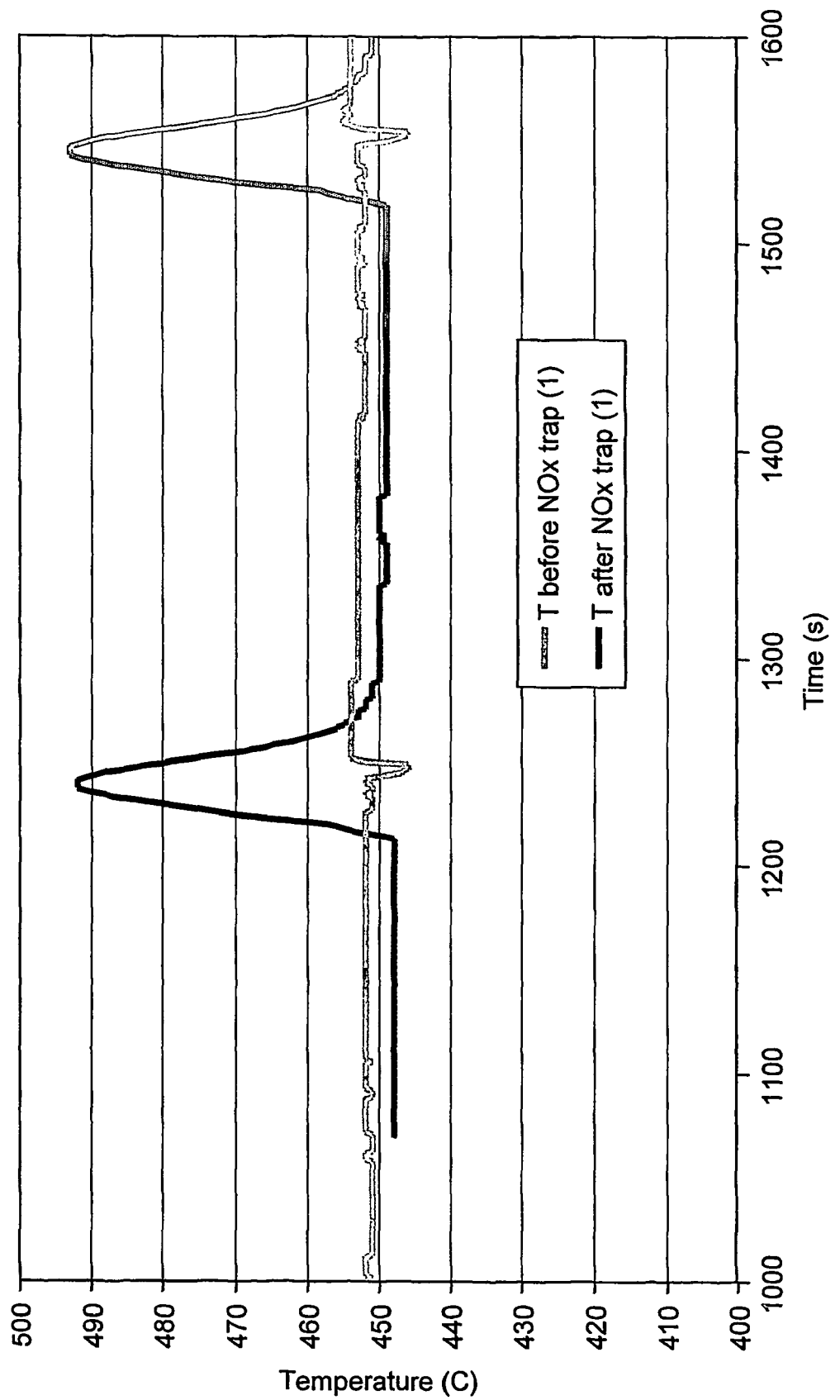
FIG. 7 is a trace of exhaust gas temperature against time showing reductant combustion with residual oxygen during a rich pulse causes an exotherm over $NO_x$ trap (1)
Figure 8:
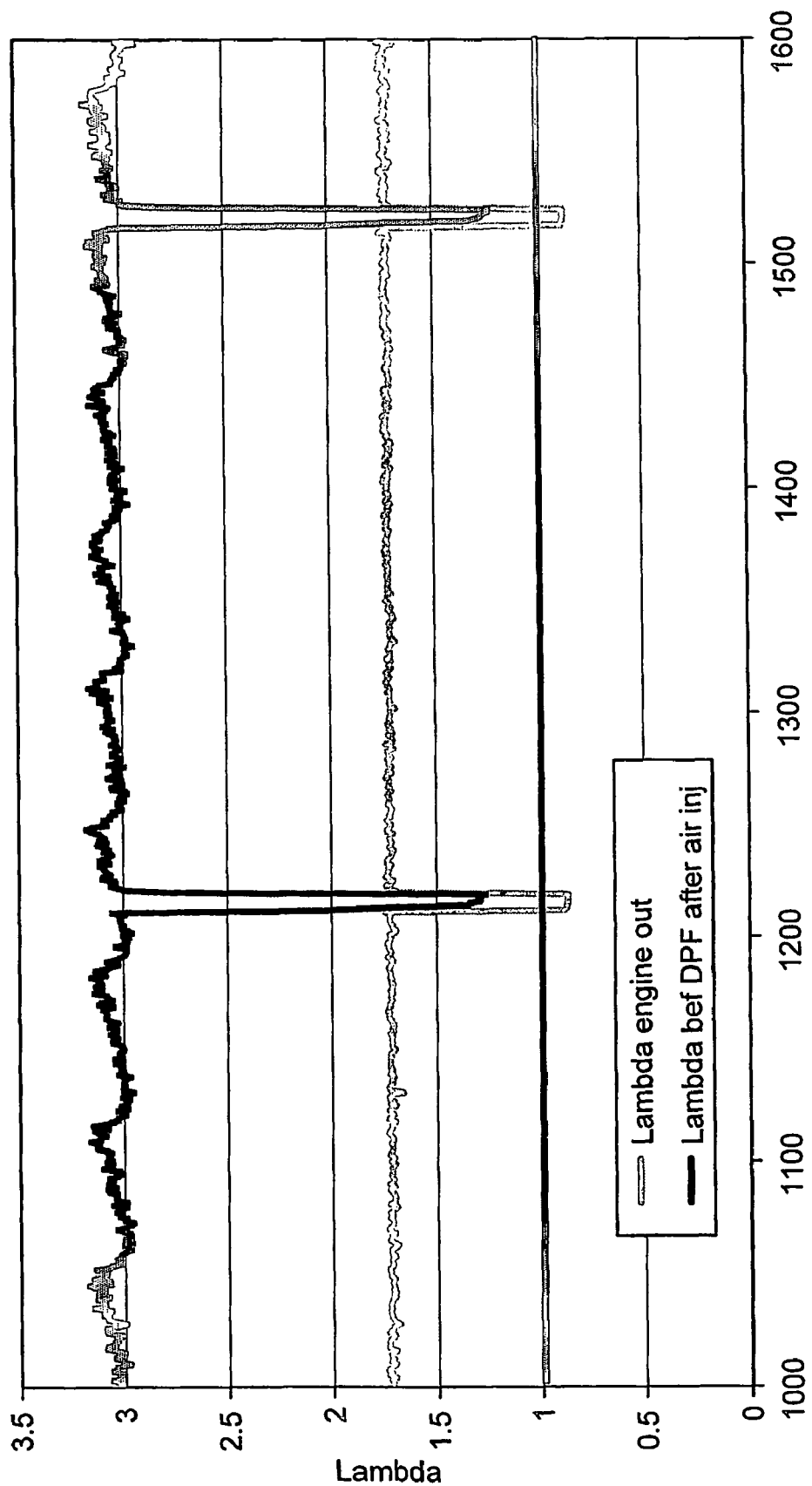
FIG. 8 is a trace of exhaust gas lambda value taken upstream and downstream of $NO_x$ trap (1) with air-injection downstream of $NO_x$ trap (1)
Figure 9:
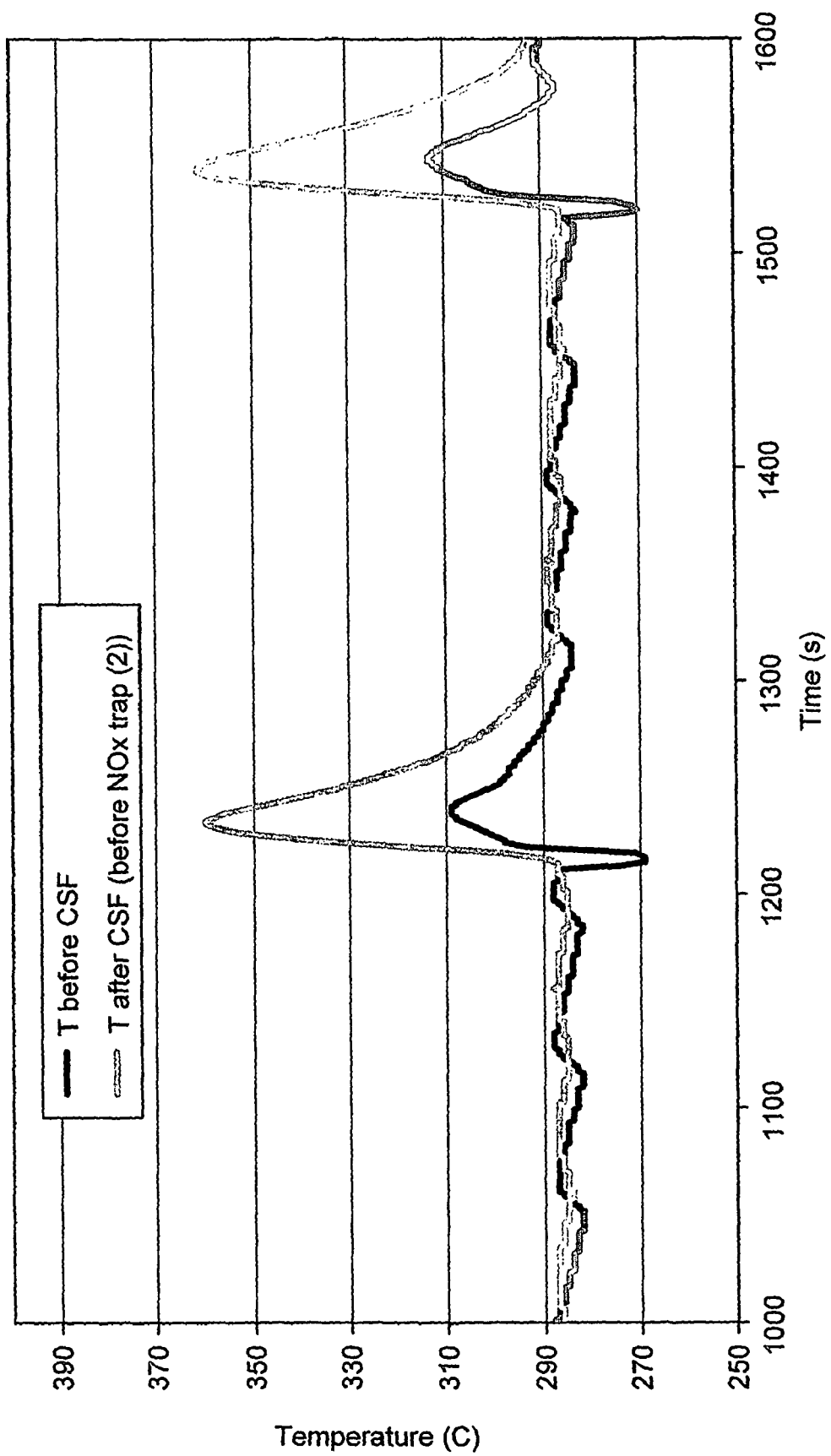
FIG. 9 is a trace of exhaust gas temperature taken upstream and downstream of a catalysed soot filter following air-injection between $NO_x$ trap (1) and the filter.

Introducing air after $NO_x$ trap (1) during a rich pulse results in constant lean conditions in the downstream CSF as can be seen in FIG. 8. The results of FIGS. 7 and 8 show that the exhaust lambda is rich before $NO_x$ trap (1), allowing $NO_x$ trap regeneration (see FIG. 7) and air injection post $NO_x$ trap (1) can provide constant lean conditions in the CSF downstream of $NO_x$ trap (1). The elevated temperatures from reductant combustion over $NO_x$ trap (1) (FIG. 7) can be high enough to allow soot regeneration of the CSF to occur in the lean conditions. Alternatively, excess reductant can slip through $NO_x$ trap (1) and be combusted over the CSF under the lean conditions resulting from air/lean exhaust injection, again resulting in high CSF temperatures which can allow soot regeneration to occur, see FIG. 9 which shows an increase in CSF temperature due to rich pulse reductant combustion in lean conditions caused by air injection after $NO_x$ trap (1) but before CSF.

Figure 10:
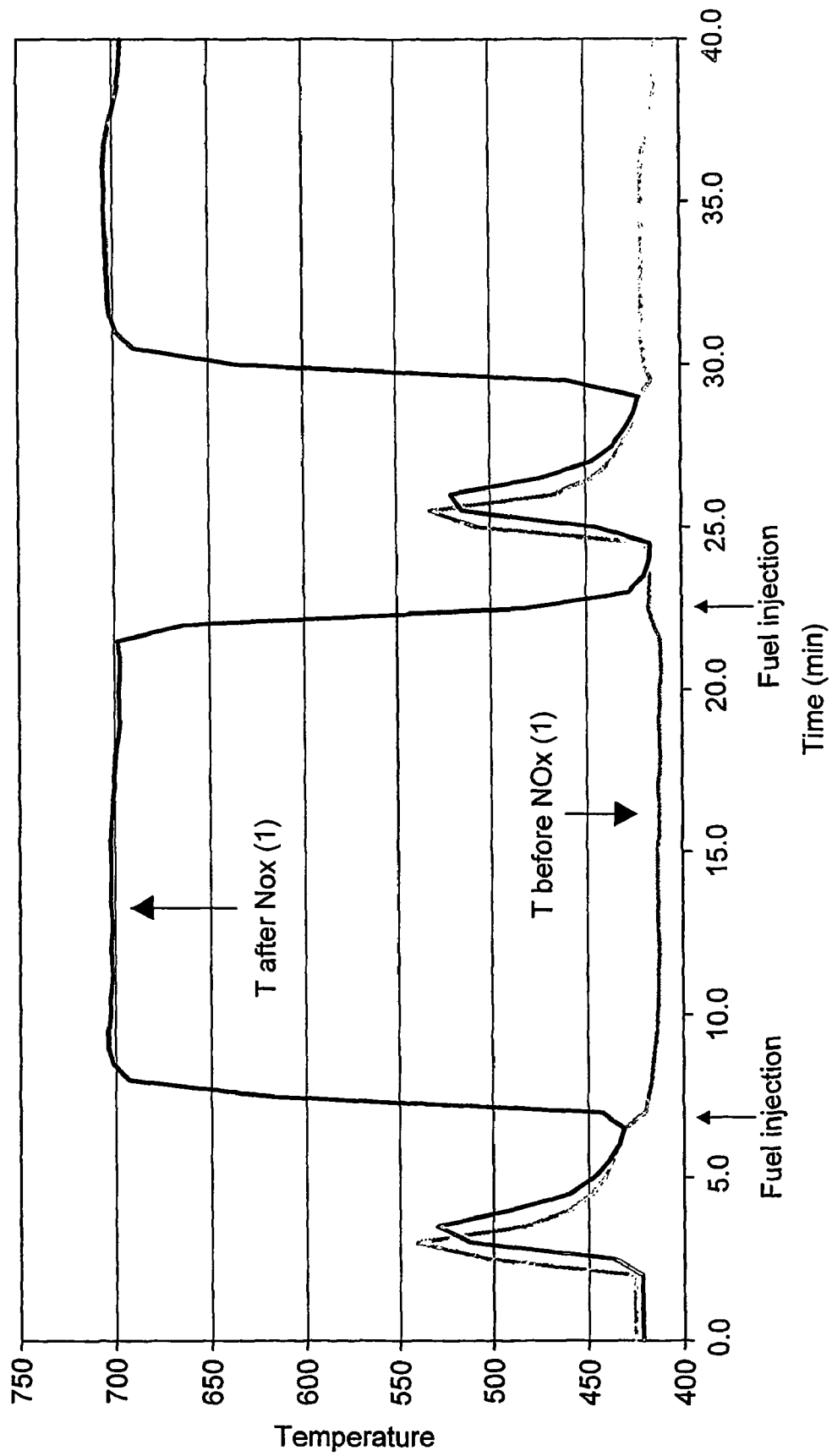
FIG. 10 is a trace of exhaust gas temperature against time showing lean exotherm generation of $NO_x$ trap (1)

Extra fuel was introduced into the exhaust gas upstream of $NO_x$ trap (1), but only enough to maintain a lean composition overall. This creates an exotherm that can be used to regenerate the soot in the CSF (see FIG. 10). $NO_x$ can also be thermally released from $NO_x$ trap (1) in the same way, resulting in an increased in $NO_2$ concentration upstream of the CSF, which is available for reaction with soot on the CSF according to the process described in EP 0341832.

Figure 11:
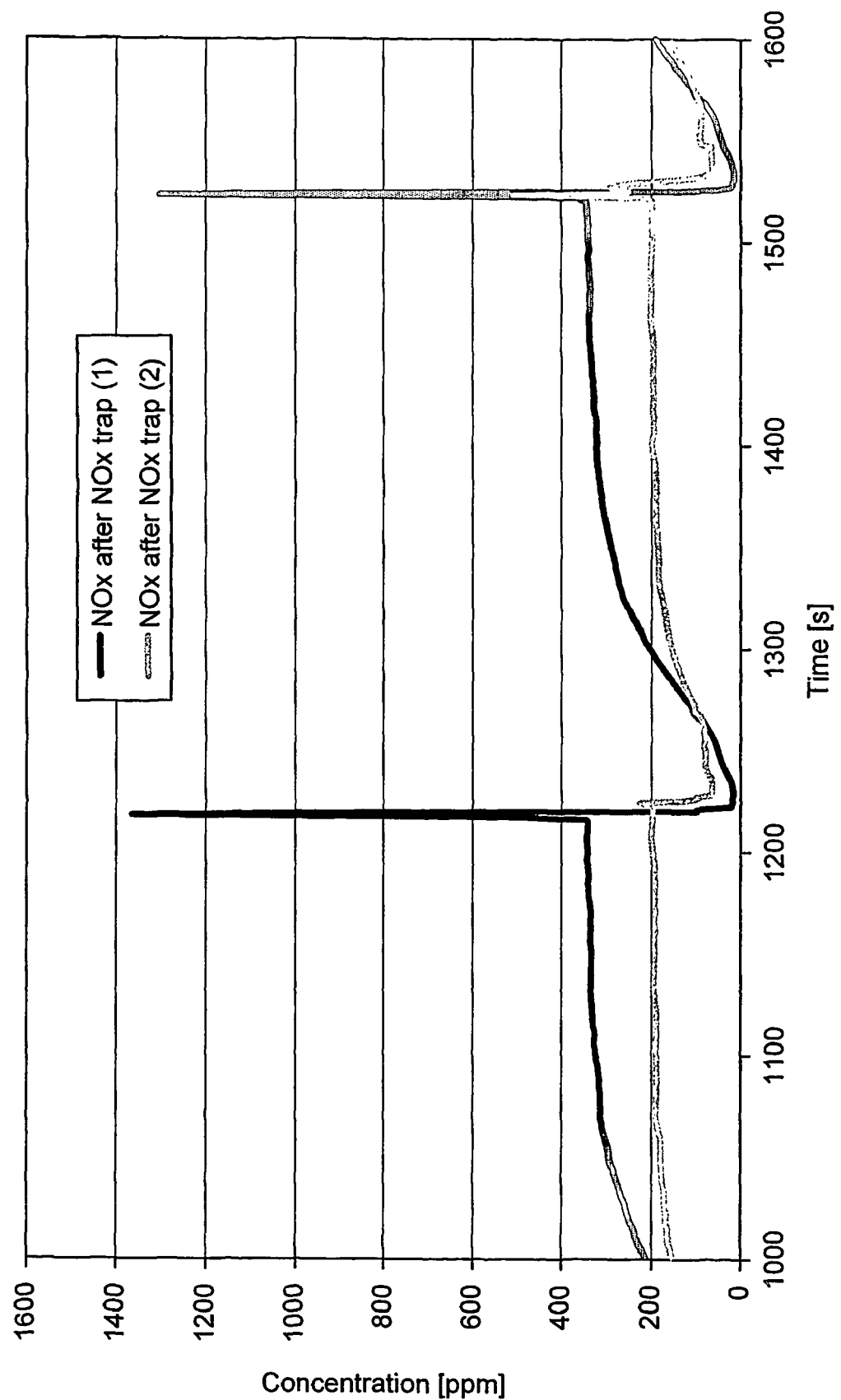
FIG. 11 is a trace of $NO_x$ concentration against time showing how $NO_x$ trap (2) stores $NO_x$ that slips from $NO_x$ trap (1) in both normal lean mode and during a rich pulse where air is injected between the CSF and $NO_x$ trap (1).

$NO_x$ trap (2) can store $NO_x$ that slips from $NO_x$ trap (1) and the CSF (see FIG. 11) in both the lean and (when air injection is present in between $NO_x$ trap (1) and the CSF) during the rich pulse. Regeneration of $NO_x$ trap (2) could be readily accomplished with fuel injection in between the CSF and $NO_x$ trap (2) as per normal $NO_x$ trap operation (see EP 0758713).

The invention claimed is:

1. A method of controlling nitrogen oxides ($NO_x$) and particulate matter (PM) in the exhaust system of a lean burn internal combustion engine, which method comprising collecting PM on a filter from an exhaust gas downstream of a first $NO_x$ absorbent, absorbing $NO_x$ in the first $NO_x$ absorbent when the first $NO_x$ absorbent is below about 300° C. in temperature, desorbing absorbed $NO_x$ when the first $NO_x$ absorbent is at above 300° C. to add to pre-existing $NO_x$ in the exhaust gas, combusting the collected PM with $NO_2$ in the exhaust gas and absorbing $NO_x$ derived from the combustion of collected PM with the $NO_2$ in a second $NO_x$ absorbent.

2. A method according to claim 1, wherein the first $NO_x$ absorbent desorbs absorbed $NO_x$ during lambda>1 conditions.

3. A method according to claim 1, wherein the first $NO_x$ absorbent is selected from a compound of the group consisting of at least one of cerium, lanthanum, alumina ($Al_2O_3$), iron, zinc, calcium, sodium, magnesium and mixtures of any two or more thereof.

4. A method according to claim 1, wherein the second $NO_x$ absorbent stores $NO_x$ at from about 300° C. to about 550° C. during lambda>1 conditions.

5. A method according to claim 1, wherein the second $NO_x$ absorbent is selected from a compound of the group consisting of at least one alkali metal, at least one alkaline earth metal, at least one rare earth metal, and mixtures of any two or more thereof.

6. A method according to claim 1 further comprising catalyzing the collected PM on the filter with at least one PGM.

7. A method according to claim 1 further comprising oxidising NO in the exhaust gas to $NO_2$ using an oxidation catalyst, wherein the oxidation catalyst is disposed between the first $NO_x$ absorbent and the filter.

8. A method according to claim 1 further comprising storing oxygen using an oxygen storage component (OSC) disposed between one of the first $NO_x$ absorbent and the filter; or the filter and the second $NO_x$ absorbent.

9. A method according to claim 1 further comprising oxidising NO in the exhaust gas to $NO_2$ using an oxidation catalyst, which catalyst is disposed between an exhaust manifold and the first $NO_x$ absorbent.

10. A method according to claim 1, wherein at least one of the first $NO_x$ absorbent and the second $NO_x$ absorbent comprises at least one platinum group metal (PGM).

11. A method according to claim 10, wherein the at least one PGM comprises platinum and rhodium.

12. A method according to claim 10, wherein the at least one PGM consists of platinum.

13. A method according to claim 1 further comprising enriching the exhaust gas with a reductant upstream of the first $NO_x$ absorbent.

14. A method according to claim 13 further comprising at least one of:
  (a) introducing secondary air or a lean exhaust gas into the exhaust gas between the first $NO_x$ absorbent and the filter; and
  (b) introducing secondary air or a lean exhaust gas into the exhaust gas between the filter and the second $NO_x$ absorbent.

15. A method according to claim 13, wherein the reductant is a hydrocarbon.

16. A method according to claim 13, wherein the exhaust gas is enriched using a first enriching means comprising a first port for injecting the reductant, wherein the first port is disposed between an exhaust manifold and the first $NO_x$ absorbent.

17. A method according to claim 16 further comprising at least one of:
  (i) enriching the exhaust gas using a second enriching means between the first $NO_x$ absorbent and the filter, which second enriching means comprising a second port for injecting the reductant which second port is disposed between the first $NO_x$ absorbent and the filter; and
  (ii) enriching the exhaust gas using a third enriching means between the filter and the second $NO_x$ absorbent, which third enriching means comprising a third port for injecting the reductant which third port is disposed between the filter and the second $NO_x$ absorbent.

* * * * *